United States Patent
Jang et al.

(10) Patent No.: US 7,364,659 B2
(45) Date of Patent: Apr. 29, 2008

(54) PREPARATION OF ASYMMETRIC POLYETHYLENE HOLLOW FIBER MEMBRANE

(75) Inventors: Moon-Seog Jang, Seoul (KR);
Sung-Soo Kim, Seoul (KR);
Myung-Nam Han, Seoul (KR); Jin-Ho Kim, Yongin-si (KR); Min-Soo Park, Seoul (KR)

(73) Assignee: KMS Co., Ltd. (KR)

( * ) Notice: Subject to any disclaimer, the term of this patent is extended or adjusted under 35 U.S.C. 154(b) by 287 days.

(21) Appl. No.: 11/211,889

(22) Filed: Aug. 24, 2005

(65) Prior Publication Data

US 2007/0045175 A1     Mar. 1, 2007

(51) Int. Cl.
*B01D 39/00* (2006.01)
*B01D 39/26* (2006.01)
*B29C 47/00* (2006.01)
*B29C 47/12* (2006.01)
*B29C 71/00* (2006.01)
*D01D 5/14* (2006.01)
*B01D 63/00* (2006.01)

(52) U.S. Cl. ............... 210/500.36; 210/500.23; 210/500.27; 264/41; 264/177.17; 264/180; 264/197; 264/235; 264/235.6; 264/235.8; 264/236

(58) Field of Classification Search .......... 210/500.27, 210/500.36, 500.23, 321.89, 321.8, 490; 264/41, 235, 236.1, 236, 237, 236.6, 236.8, 264/177.17, 197, 180; 95/13
See application file for complete search history.

(56) References Cited

U.S. PATENT DOCUMENTS

| 4,115,492 | A | * | 9/1978 | Mahoney et al. ............ 264/49 |
| 4,486,202 | A | * | 12/1984 | Malon et al. ................ 96/13 |
| 4,530,809 | A | * | 7/1985 | Shindo et al. ........... 264/210.7 |
| 4,824,568 | A | * | 4/1989 | Allegrezza et al. ........ 210/490 |
| 5,084,173 | A | * | 1/1992 | Nitadori et al. ........ 210/321.89 |
| 5,250,240 | A | * | 10/1993 | Kim et al. .................... 264/41 |
| 5,294,338 | A | * | 3/1994 | Kamo et al. ............ 210/321.8 |
| 5,698,101 | A | * | 12/1997 | Kopp et al. ............ 210/500.23 |
| 6,852,223 | B2 | * | 2/2005 | Huang et al. .......... 210/500.36 |
| 6,890,436 | B2 | * | 5/2005 | Komatsu et al. ....... 210/500.41 |

* cited by examiner

*Primary Examiner*—Ana Fortuna
(74) *Attorney, Agent, or Firm*—Anderson Kill & Olick, P.C.

(57) ABSTRACT

A porous polyethylene hollow fiber membrane having a pore-size gradient across the inner and outer surfaces thereof is prepared by introducing, during the cooling step of a melt-spun polyethylene hollow fiber, a nitrogen flow and a solvent having a boiling point in the range of 30 to 80° C. to the inner and outer surfaces of the melt-spun hollow fiber, respectively.

20 Claims, 7 Drawing Sheets

PREPARATION OF ASYMMETRIC POLYETHYLENE HOLLOW FIBER MEMBRANE

FIELD OF THE INVENTION

The present invention relates to a method for preparing a polyethylene hollow fiber membrane having a pore-size gradient thereacross between its inner and outer wall surfaces, which is useful for water-treatment.

BACKGROUND OF THE INVENTION

Porous polyethylene hollow fiber membranes are conventionally prepared by: melt-spinning polyethylene through a spinneret equipped with a double nozzle; cooling the spun hollow fiber; annealing, cold-stretching and hot-stretching the resulting hollow fiber; and heat-setting the stretched hollow fiber.

During the cooling step, the melt-spun polyethylene hollow fiber is crystallized, and when the fiber is subjected to stress along the direction of the drawing, micro-fibrils are formed lengthwise on the fiber, to form lamella stacks. Amorphous regions are present between lamella stacks, and the stretching step opens up the amorphous region to render the hollow fiber porous. When the cooling rate is rapid, the size of final pores becomes small, and when slow, comparatively large.

Thus, the cooling step in the manufacture of a hollow fiber membrane is critical in determining the pore size and form, and the characteristics of the porosity of a final hollow fiber membrane.

Hitherto, the cooling has been generally performed by introducing a cooling air stream maintained at room temperature to the outer wall surface thereof. Such a cooling procedure produces a hollow fiber membrane having a uniform pore-size distribution throughout the thickness of the membrane (uniform-porosity hollow fiber membrane). However, such a uniform pore-sized hollow fiber membrane is not satisfactory in terms of water permeability and particle cut-off property.

Meanwhile, U.S. Pat. No. 5,294,338 (Kamo et al.) discloses a porous polyethylene hollow fiber membrane having rectangular pores, and a hydrophilized porous hollow fiber membrane obtained by coating a hydrophilic polymer on the outer surface of said hollow fiber membrane. The hydrophilic coating layer of the hydrophilized hollow fiber membrane, however, undesirably gets abraded with several uses.

SUMMARY OF THE INVENTION

Accordingly, it is an object of the present invention to provide a method for preparing a porous polyethylene hollow fiber membrane having a pore-size gradient across the inner and outer wall surface thereof, which shows uniquely improved properties in terms of water permeability and particle cut-off property.

In accordance with one aspect of the present invention, there is provided a method for preparing a polyethylene hollow fiber membrane having a pore-size gradient across the inner and outer surfaces thereof, which comprises: melt-spinning the starting polyethylene resin of the fiber through a spinneret having a double nozzle; cooling the spun hollow fiber; annealing, cold-stretching and hot-stretching the resulting hollow fiber; and then heat-setting the stretched hollow fiber, wherein during the cooling step, a nitrogen flow is introduced to the inside of the melt-spun hollow fiber while a solvent having a boiling point in the range of 30 to 80° C. is introduced such that said solvent is sprayed in line with the direction of spinning and towards the outer surface thereof.

BRIEF DESCRIPTION OF THE DRAWINGS

The above and other objects and features of the present invention will become apparent from the following description of the invention, when taken in conjunction with the accompanying drawings, which respectively show.

1: hopper
2: extruder
3: gear pump
4: spinneret
5: baffle
6: cooling chamber
7: hollow fiber
8: suction pump
9: condenser
10: feed fan
11: drain valve
12: nitrogen tank
13: roller
14: winding bobbin

DETAILED DESCRIPTION OF THE INVENTION

The method of the present invention is characterized by the use of a solvent having a boiling point ranging from 30 to 80° C. as a cooling medium for the outer surface of the hollow fiber, which results in more rapid crystallization of the outer surface thereof than the inner surface, to create a gradient of decreasing crystallinity between the outer and inner surfaces of the membrane.

The polyethylene resin which may be employed as a raw material in the present invention has a high density of 0.96 g/cm$^3$ or more and a melt index of 0.03 to 8.0 g/10 min, preferably 0.1 to 5.5 g/10 min.

Figure 1:
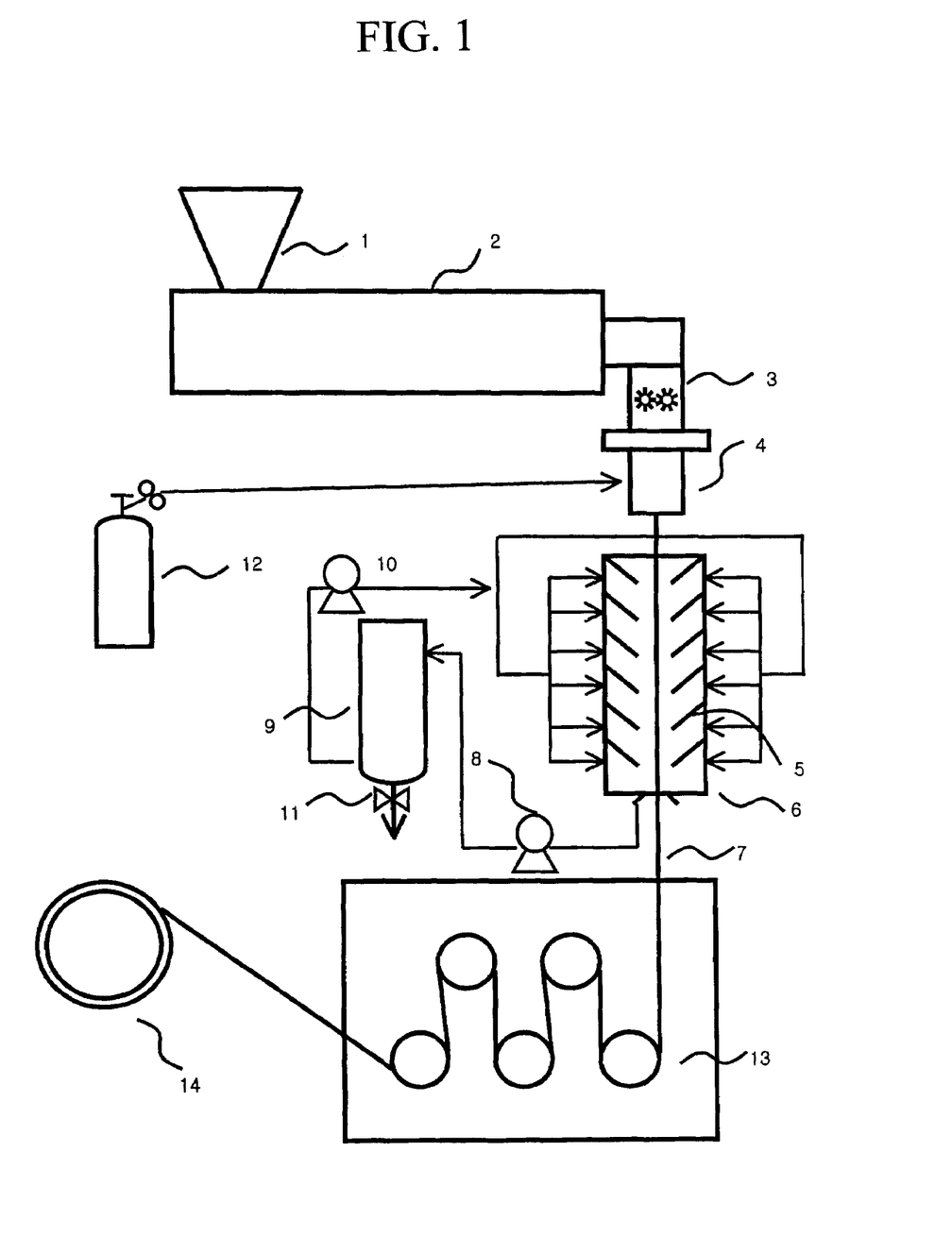
FIG. 1: a schematic diagram of an exemplary apparatus that can be used in the preparation of the inventive polyethylene hollow fiber.

FIG. 1 illustrates a schematic diagram of an exemplary apparatus that can be used in the preparation of the unstretched fiber in the manufacture of the inventive polyethylene hollow fiber.

As shown in FIG. 1, a high density polyethylene resin is loaded into a hopper (1) of a cylinder-type extruder (2), melted and then transferred with a gear pump (3) to a spinneret (4) having a double nozzle.

The molten polyethylene may be spun at a temperature ranging from 150 to 220° C., preferably 170 to 220° C., at a spinning draft ratio (winding linear velocity/spinning linear velocity) ranging from 100 to 800 through the spinneret (4).

For the purpose of cooling right after the spinning, a nitrogen flow is continuously supplied to the inside of the spun hollow fiber through an inner nozzle in the spinneret. The nitrogen gas fed from a nitrogen tank (12) into the spinneret (4) becomes heated to the same temperature as that of the nozzle body, i.e., to the above-mentioned spinning temperature. The linear velocity of the supplied nitrogen gas may be in the range from 0.1 to 0.3 m/min.

In addition, in accordance with the present invention, as the spun hollow fiber traverses the cooling zone of a cooling chamber (6) located below the nozzle, a liquid form of a solvent having a boiling point in the range of 30 to 80° C. is sprayed in line with the spinning and towards the outer surface of the melt-spun hollow fiber through a baffle (5) in the cooling chamber (6), which allows rapid cooling of the outer surface thereof due to high cooling efficiency of the used cooling solvent.

Such a difference in the cooling rate, i.e., the crystallization rate, between the inner and outer surfaces of the spun hollow fiber generates a gradient of pore-size distribution across the depth of the hollow fiber membrane.

Exemplary cooling solvents which may be used in the present invention include methanol, ethanol, acetone, methylethylketone, ethylformate, carbon tetrachloride, chlorinated and fluorinated hydrocarbon and the like. The cooling solvent may be introduced in the liquid form at a spray speed ranging from 0.5 to 3 m/sec. In order to attain a higher cooling efficiency than using a conventional cooling medium such as an air stream, the rate of introducing the cooling solvent must be carefully controlled so as not to cause shaking of the spun hollow fiber, which lowers the uniformity of the membrane.

Referring to the apparatus shown in FIG. 1, the liquid-phase cooling solvent is sprayed in a form of fine particles into the cooling chamber (6) with a feed pump (10), and the sprayed solvent is vaporized in an endothermic fashion. The vaporized solvent is transferred to a condenser (9) by a suction fan (8), and condensed solvent is refurnished to be recycled into the cooling chamber (6) with the feed pump (10). The cooling solvent may be continuously supplied from a separate storage tank without using the condenser.

The hollow fiber (7) which passed through the cooling chamber (6) is wound on a winding bobbin (14) via rollers (13) and annealed in the wound state in an oven heated at a temperature of 80 to 130° C., preferably 120 to 127° C. for 2 to 24 hrs, preferably 6 to 24 hrs. The annealing process induces further crystallization of the amorphous region present in the hollow fiber, thereby raising the degree of crystallization, to make the crystallization and amorphous regions distinct.

The annealed hollow fiber is then cold-stretched to the extent ranging from 5 to 100% at a temperature ranging from room temperature to 40° C. with a series of stretching rollers such that the deformation rate (stretched extent per second) can be controlled in the range from 50 to 200% per second, preferably from 50 to 150% per second.

Then, the cold-stretched hollow fiber is hot-stretched to the extent ranging from 300 to 1,000% at a temperature ranging from 80 to 130° C., preferably from 105 to 120° C. with a series of stretching rollers, at a deformation rate ranging from 1 to 10% per second. Such a cold-stretching with a relatively rapid rate generates microcrazes in the hollow fiber. On the other hand, a hot-stretching at a relatively slow rate opens up microcrazes generated by cold-stretching to generate pores.

Finally, the porous structure thus formed by the hot-stretching is wound on a bobbin and heat-set at a temperature ranging from 110 to 130° C. for 0.5 to 30 minutes to form the inventive polyethylene hollow fiber membrane.

The polyethylene hollow fiber membrane of the present invention, prepared by the above method, has a tensile strength of 1,000 gf/filament or more, high porosity and a significant pore-size gradient across the inner and outer surfaces thereof.

As described above, the inventive asymmetric and high strength polyethylene hollow fiber membrane exhibits improved water permeability and particle cut-off properties, and thus can be advantageously employed as a separation membrane for water-treatment.

The following Examples are given for the purpose of illustration only, and are not intended to limit the scope of the invention. In the Examples and Comparative Examples, the characteristics of the hollow fiber membranes produced were evaluated in accordance with the following methods.

(1) Air Permeability

Fifteen porous hollow fiber membranes were bundled in an acryl tube having a 15 cm length, 1 cm outer diameter and 0.7 cm inner diameter, and the open ends were blocked with an epoxy resin to fabricate a module.

The effective length of the hollow fiber membranes was 12 cm. An air pressure of 0.5 atm was applied to the inside of the hollow fiber membranes of the module at 25° C., and the amount of air that escaped through the walls was determined to be the air permeability.

(2) Water Permeability

A hollow fiber membrane module was prepared by the method described in the "Air Permeability" measurement. After the hollow fiber membranes of the module were hydrophilized by using a surfactant, the water permeability of the hydrophilized hollow fiber membranes was determined. An aqueous solution prepared with 20% by volume Tween 80 (commercially available from Aldrich Co.) was used as the surfactant.

First, the Tween 80 solution was fed to the inside of the hollow fiber membranes of the module at a feed pressure of 1 kgf/cm$^2$ for 15 min while keeping the back pressure regulator open, in accordance with a cross flow filtration method. The back pressure regulator was then closed and the feeding was continued with the dead-end filtration method. When the pressure became constant, the feeding was stopped. Thereafter, distilled water was introduced for 5 min under the condition that the back pressure regulator was open, in accordance with a cross flow filtration method so that the Tween 80 solution present in the pores of the hollow fiber was replaced by water. The back pressure regulator was then closed and the feeding of water was continued with the dead-end filtration method. When the pressure became constant, the permeated water was collected for 10 min and the total amount thereof is referred to as water permeability.

(3) Tensile Strength

The tensile strength of a 100 mm-long hollow fiber membrane was measured at a test rate of 50 mm/min using INSTRON.

(4) Pore Size

A 15,000-fold magnified image of a hollow fiber membrane surface was obtained using SEM (scanning electronic microscope), and then, the average length of each of major and minor axes of pores which were randomly selected among pores in the image was measured using an image analyzer.

(5) Particle Cut-Off Property

An aqueous solution of 0.1% by weight polystyrene having a particle size distribution ranging from 0.1 to 0.62 μm was allowed to pass through a hollow fiber membrane sample from its exterior to its interior. The size of particles present in the permeated solution was measured and the size of the largest particle was referred to as particle cut-off property.

EXAMPLE 1

A polyethylene resin having a melt index of 0.35 g/10 min and a density of 0.963 g/cm$^3$ was melt-spun at 180° C. through a spinneret having a double nozzle slit form while injecting a nitrogen gas flow into the inner nozzle of the spinneret. The spun hollow fiber was solidified by passing successively through a cooling zone disposed just below the nozzle where liquid freon kept at 20° C. was sprayed downward (co-currently) at a rate of 2 m/sec through multiple spray nozzles so that the freon spray contacts and cools the outer surface of the spun hollow fiber. The solidified hollow fiber was wound on a winding bobbin via rollers and annealed at 120° C. for 24 hrs. The annealed hollow fiber was cold-stretched (room temperature) to the extent of 50% at a deformation rate of 110% per second. Then, the cold-stretched hollow fiber was hot-stretched to the extent of 600% at 110° C., at a deformation rate of 5% per second, to form a stretched hollow fiber, which was heat-set at 115° C. for 10 min to obtain a final hollow fiber membrane.

The properties of the hollow fiber membrane thus obtained were determined and the results are showed in Table 1.

Examples 2 and 3, and Comparative Examples 1 To 5

The procedures of Example 1 were repeated except for changing the cooling medium and conditions as specified in Table 1, to obtain various hollow fiber membranes. The properties of the hollow fiber membranes thus obtained were determined and the results are showed in Table 1.

Figure 2A:
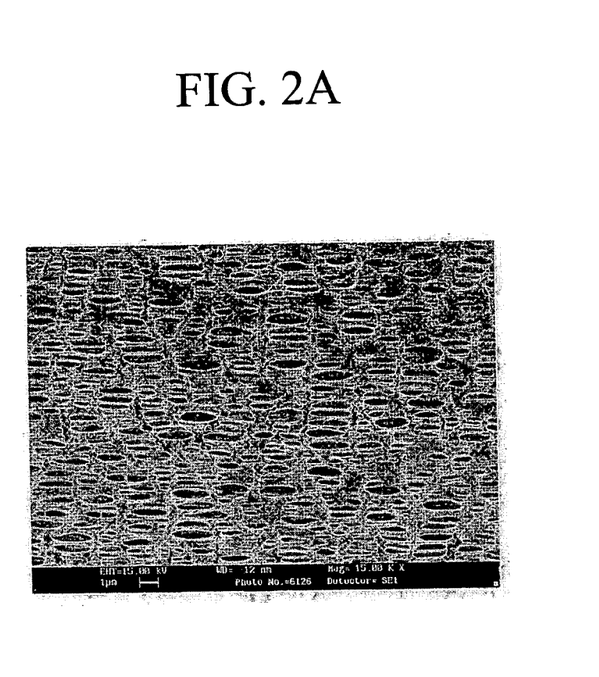
FIGS. 2A and 2B: SEM photographs of the outer and inner wall surfaces of the hollow fiber membrane obtained in Example 1, respectively.
Figure 2B:
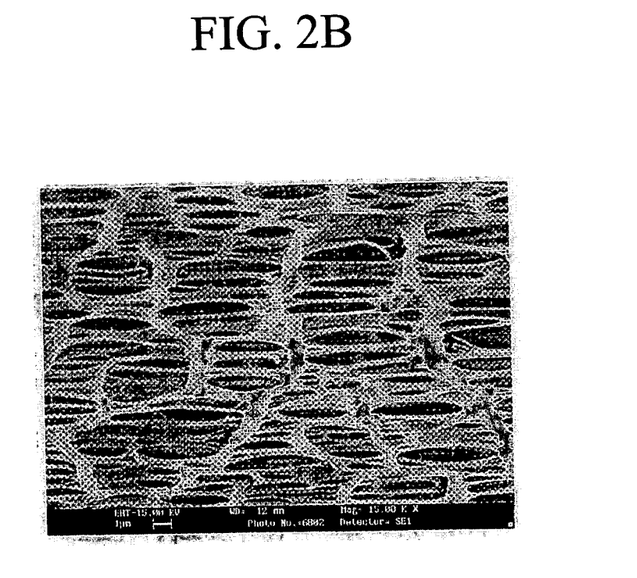
Figure 3A:
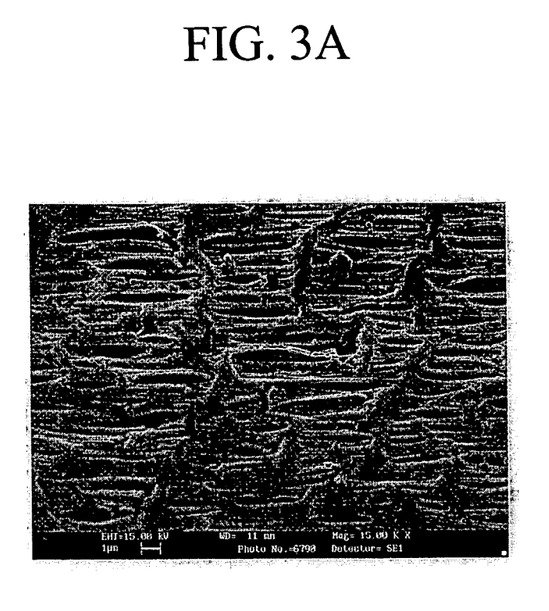
FIGS. 3A and 3B: SEM photographs of the outer and inner wall surfaces of the hollow fiber membrane obtained in Comparative Example 1, respectively.
Figure 3B:
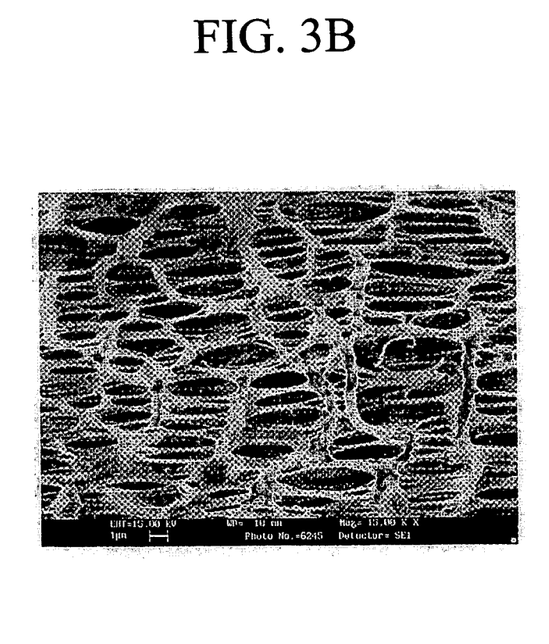
Figure 4A:
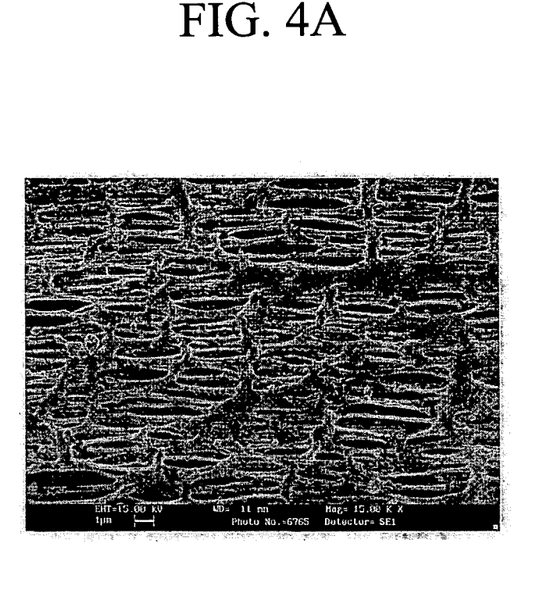
FIGS. 4A and 4B: SEM photographs of the outer and inner wall surfaces of the hollow fiber membrane obtained in Comparative Example 2, respectively.
Figure 4B:
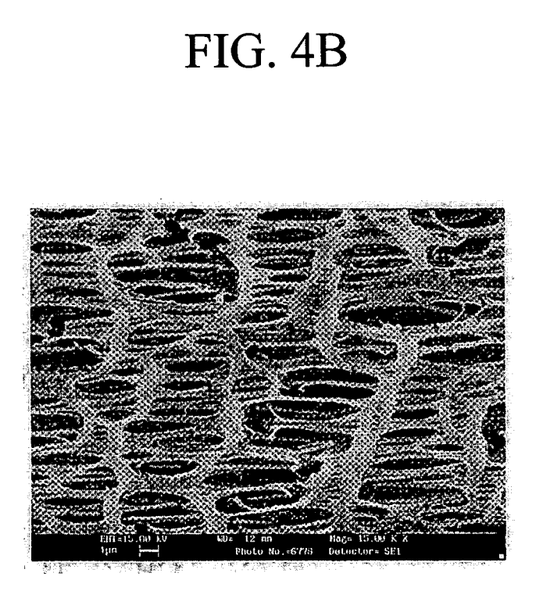
Figure 5A:
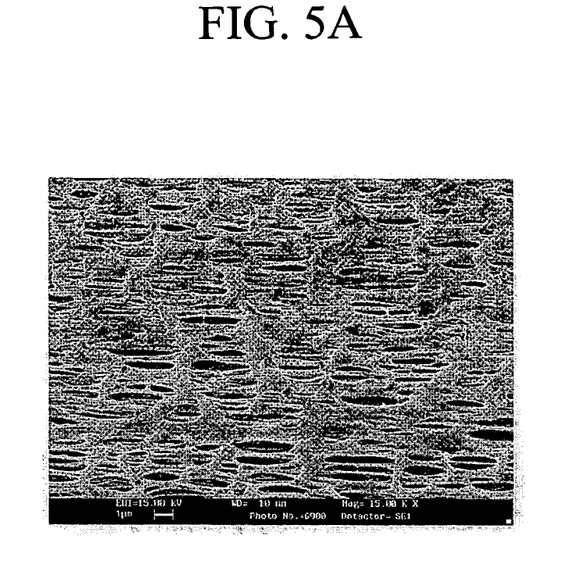
FIGS. 5A and 5B: SEM photographs of the outer and inner wall surfaces of the hollow fiber membrane obtained in Comparative Example 3, respectively.
Figure 5B:
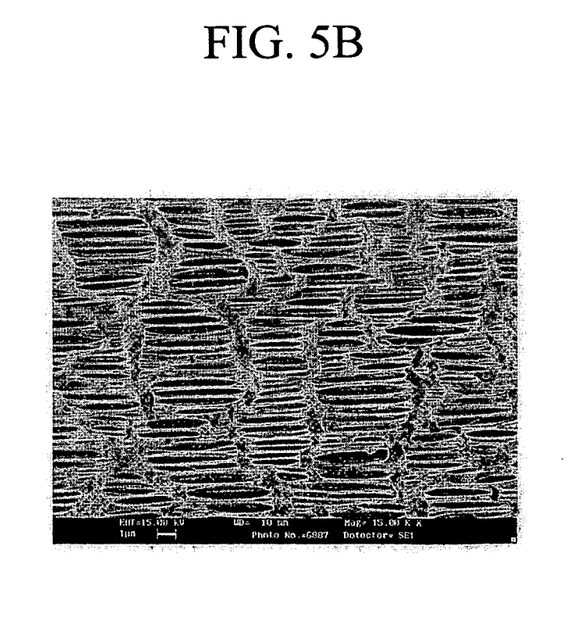
Figure 6A:
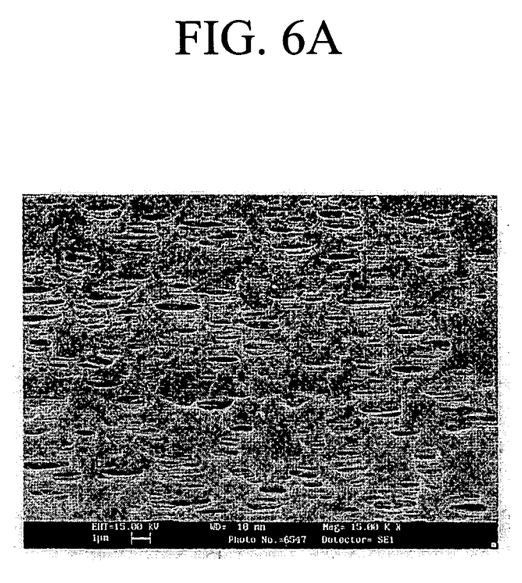
FIGS. 6A and 6B: SEM photographs of the outer and inner wall surfaces of the hollow fiber membrane obtained in Comparative Example 4, respectively.
Figure 6B:
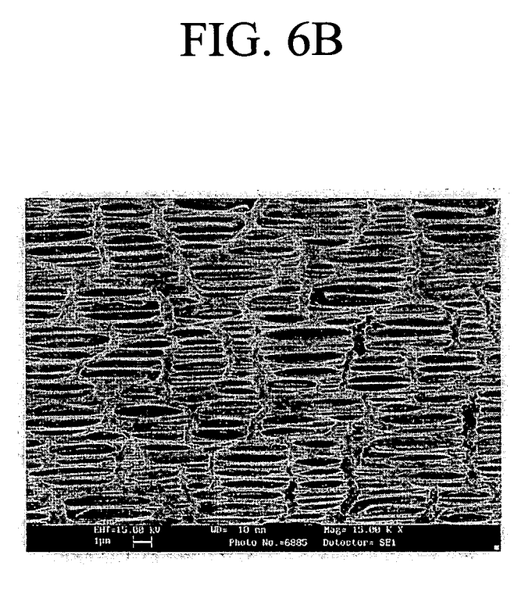
Figure 7A:
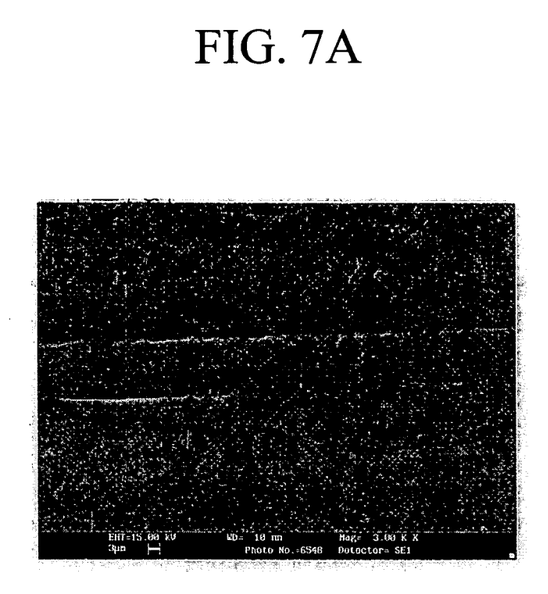
FIGS. 7A and 7B: SEM photographs of the outer and inner wall surfaces of the hollow fiber membrane obtained in Comparative Example 5, respectively.
Figure 7B:
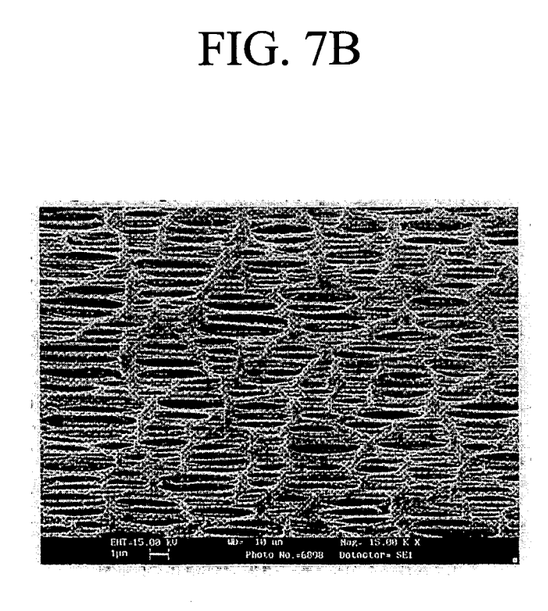

Further, SEM photographs of the outer and inner wall surfaces of each of the hollow fiber membranes obtained in Example 1 and Comparative Examples 1 to 5 are shown in FIGS. 2A and 2B, 3A and 3B, 4A and 4B, 5A and 5B, 6A and 6B, and 7A and 7B, respectively. FIGS. 2A and 2B (Example 1) show that its outside has much more small pores, i.e., more porous, than the inside. In contrast, FIGS. 3 and 4 (Comparative Examples 1 and 2, respectively) show that the outside (A) and inside (B) pore structures are similar to each other, and FIGS. 5 and 6 (Comparative Examples 3 and 4, respectively) show that the outside has small pores, but only a few in number, i.e., less porous, than the inside. FIGS. 7A and 7B (Comparative Example 5) show that no pores were formed in the outside layer.

TABLE 1

| No. | Cooling medium | Outer diameter (μm) | Wall thickness (μm) | Properties of the membrane | | | | | |
|---|---|---|---|---|---|---|---|---|---|
| | | | | ⓐ | ⓑ | ⓒ | ⓓ | ⓔ | ⓕ |
| Ex. 1 | 20° C., cocurrent freon | 610 | 115 | 185 × 10$^4$ | 14,000 | 1,300 | 0.4/1.5 | 0.8/4.2 | 0.37 |
| Ex. 2 | 20° C., cocurrent acetone | 610 | 115 | 165 × 10$^4$ | 13,000 | 1,350 | 0.42/1.7 | 0.8/4.0 | 0.39 |
| Ex. 3 | 20° C., cocurrent methanol | 610 | 115 | 150 × 10$^4$ | 12,500 | 1,350 | 0.45/1.8 | 0.8/4.0 | 0.39 |
| C. E. 1 | 40° C., cocurrent air | 600 | 110 | 185 × 10$^4$ | 14,000 | 1,000 | 0.75/3.8 | 0.8/3.5 | >0.6 |
| C. E. 2 | 20° C., cocurrent air | 600 | 110 | 185 × 10$^4$ | 14,000 | 1,100 | 0.7/3.5 | 0.8/3.7 | 0.58 |
| C. E. 3 | 40° C., countercurrent air | 620 | 117 | 80 × 10$^4$ | 9,000 | 1,300 | 0.2/2.5 | 0.4/3.4 | 0.17 |
| C. E. 4 | 20° C., countercurrent air | 620 | 117 | 75 × 10$^4$ | 8,500 | 1,300 | 0.1/1.5 | 0.4/3.4 | 0.13 |
| C. E. 5 | 20° C., countercurrent freon (rate: 5 m/sec) | 625 | 122 | 50 × 10$^4$ | 50 | 1,500 | — | 0.4/3.4 | <0.1 |

* Note
ⓐ: air permeability (l/m$^2$ · hr · 0.5 bar)
ⓑ: water permeability (l/m$^2$ · hr · bar)
ⓒ: tensile strength (gf/filament)
ⓓ: average length of each of major and minor axes of the outer pore (minor axis/major axis, μm)
ⓔ: average length of each of major and minor axes of the inner pore (minor axis/major axis, μm)
ⓕ: particle cut-off property (μm)

As shown in Table 1, the hollow fiber membranes of Examples 1 through 3 show improved properties in terms of air permeability, water permeability, tensile strength and particle cut-off. But, those of Comparative Examples 1 and 2 have poor particle cut-off properties, and those of Comparative Examples 3 to 5 exhibit reduced air and water permeabilities due to the poor porosity of the outer wall surface.

As described above, the inventive asymmetric polyethylene hollow fiber membrane has improved tensile strength, water permeability and particle cut-off property, and thus be advantageously employed as a separation membrane for water-treatment.

While the invention has been described with respect to the above specific embodiments, it should be recognized that various modifications and changes may be made to the invention by those skilled in the art which also fall within the scope of the invention as defined by the appended claims.

What is claimed is:

1. A method for preparing a polyethylene hollow fiber membrane having a pore-size gradient across the inner and outer surfaces thereof, which comprises: melt-spinning the starting polyethylene resin of the fiber through a spinneret having a double nozzle; cooling the spun hollow fiber; annealing, cold-stretching and hot-stretching the resulting hollow fiber; and then heat-setting the stretched hollow fiber, wherein during the cooling step, a nitrogen flow is introduced to the inside of the melt-spun hollow fiber while a solvent having a boiling point in the range of 30 to 80° C. is introduced at a spray speed ranging from 0.5 to 3 m/sec such that said solvent is sprayed in line with the direction of spinning and towards the outer surface thereof.

2. The method of claim 1, wherein the melt index of the polyethylene is in the range of 0.1 to 5.5 g/10 mm.

3. The polyethylene hollow fiber membrane prepared by the method of claim 2.

4. The method of claim 1, wherein the polyethylene is melt-spun at a temperature ranging from 170 to 220° C.

5. The polyethylene hollow fiber membrane prepared by the method of claim 4.

6. The method of claim 1, wherein the polyethylene is melt-spun at a spinning draft ratio (winding linear velocity/spinning linear velocity) ranging from 100 to 800.

7. The polyethylene hollow fiber membrane prepared by the method of claim 6.

8. The method of claim 1, wherein the solvent is selected from the group consisting of methanol, ethanol, acetone, methylethylketone, ethylformate, carbon tetrachloride, chlorinated and fluorinated hydrocarbon and a mixture thereof.

9. The polyethylene hollow fiber membrane prepared by the method of claim 8.

10. The method of claim 1, wherein the nitrogen flow is supplied at a linear velocity ranging from 0.1 to 0.3 m/min.

11. The polyethylene hollow fiber membrane prepared by the method of claim 10.

12. The method of claim 1, wherein the annealing process is conducted at a temperature of 80 to 130° C. for 6 to 24 hrs.

13. The polyethylene hollow fiber membrane prepared by the method of claim 12.

14. The method of claim 1, wherein the cold-stretching process is conducted at a deformation rate of 50 to 200% per second to the extent of 5 to 100% at a temperature ranging from room temperature to 40° C.

15. The polyethylene hollow fiber membrane prepared by the method of claim 14.

16. The method of claim 1, wherein the hot-stretching process is conducted at a deformation rate of 1 to 10% per second to the extent of 300 to 1,000% at a temperature ranging from 80 to 130° C.

17. The polyethylene hollow fiber membrane prepared by the method of claim 16.

18. The method of claim 1, wherein the heat-setting process is conducted at a temperature ranging from 110 to 130° C. for 0.5 to 30 min.

19. The polyethylene hollow fiber membrane prepared by the method of claim 18.

20. The polyethylene hollow fiber membrane prepared by the method of claim 1.

* * * * *